F. N. STURGIS.
BUTTONER.
APPLICATION FILED MAR. 6, 1915.

1,208,043.

Patented Dec. 12, 1916.

Witnesses:
L. B. Graham
F. A. Florell

Inventor:
Frank N. Sturgis,
By Heideman Streel
Attys

UNITED STATES PATENT OFFICE.

FRANK N. STURGIS, OF WINNETKA, ILLINOIS.

BUTTONER.

1,208,043.  Specification of Letters Patent.  Patented Dec. 12, 1916.

Application filed March 6, 1915. Serial No. 12,506.

*To all whom it may concern:*

Be it known that I, FRANK N. STURGIS, a citizen of the United States, and a resident of Winnetka, in the county of Cook and State of Illinois, have invented a certain new and useful Improvement in Buttoners, of which the following is a description, reference being had to the accompanying drawing, which forms a part of my specification.

My invention relates to a buttoner more especially intended for use as a collar buttoner; the invention being particularly adapted for use with what are known as turn-over or turn-down collars, although equally applicable for use in connection with any style of collar, as will be readily understood from the following detailed description.

Figure 1:
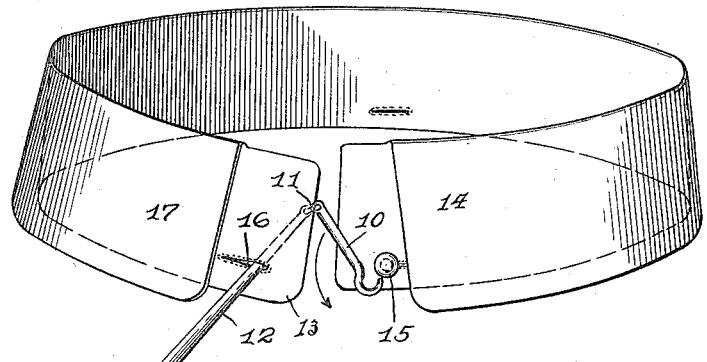
Figure 2:
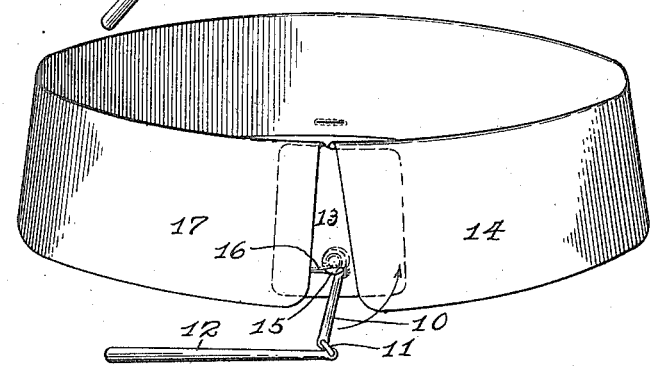
Figure 3:
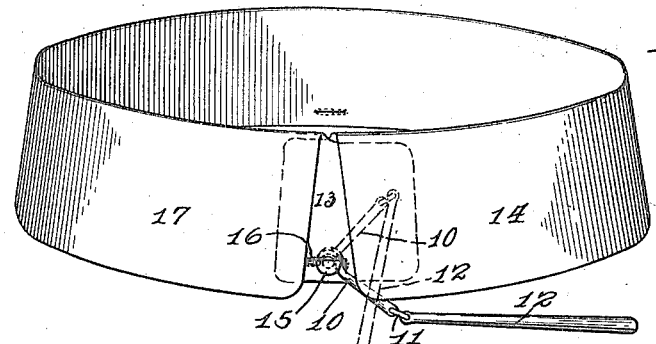
Figure 4:
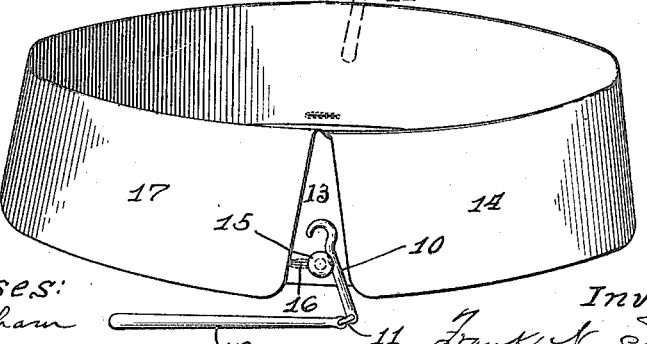

In the drawing: Figure 1 illustrates the method of employing my invention in connection with a turn-down collar, which is shown in perspective; the figure illustrating the first position of the device, namely with the hook-end of the device having been inserted through the button-hole of the unattached end of the collar and in position to be hooked about the shank of the button. Fig. 2 is a similar view, showing the hook-end secured about the shank of the button and the unattached end of the collar drawn over so as to bring the button-hole in close proximity to the button. Fig. 3 is a similar view, illustrating my improved device in the position or step of operation beyond that shown in Fig. 2, namely with the hook of the device and a portion of the head of the button being forced through the buttonhole; the position of the device, whereby the hook of the device and the head of the button, will be completely forced through the button-hole, being indicated in dotted lines. Fig. 4 is a similar view, illustrating a completion of the operation, namely with the head of the button forced through the button-hole of the second or previously unattached end of the collar and the hook of the device shown slipped or removed from the shank of the button.

In the particular exemplification of my invention, I have chosen to illustrate its use in connection with a turn-over or turn-down collar, whereby the unattached end of the collar may be drawn into closed position, while the over-lapping end-portions of the collar may assume their final positions before the head of the button has been forced through the button-hole of the unattached portion or end of the collar.

The device is especially useful in connection with collars of the type shown which snugly fit the neck of the wearer, and wherein the turn-down portions or folds come into close contact with each other when the collar is buttoned.

The buttoner is made of any suitable material, such as metal, and the like, and preferably circular in cross section throughout the major portion of its length, so as to move smoothly through the button-hole without injuring the same.

The device comprises a hook-portion or section 10 which is connected by means of one or more suitable links 11 to the handle-section or portion 12. In order to adapt the device to the use for which my invention is especially intended, the section or portion 10 is made comparatively short, so as to permit it to move through the arc of a circle, having the button as a center, between the inner and outer folds 13 and 14 of the collar, as indicated in dotted lines in Fig. 3; in other words so that the section or portion 10 may be moved or swung through the space intermediate of the button and the top of the collar and between the folds 13 and 14 of the collar.

The sectional portion 12 may be of any suitable length sufficient to permit the user to properly manipulate the device, and the free end of the sectional portion 12 may be given any configuration in cross section desired, as it need not be passed through the button-hole. The connection between the sections, or portions 10 and 12 are preferably formed by means of one or more links 11, of suitable material, which are secured to the sections or portions by preferably passing them through perforations in the adjacent ends of the sections or portions 10 and 12, as shown. The connection between the sections or portions 10 and 12 is made of such flexibility or looseness as will permit the movement of the sections or portions into any inclination or angle, relative to each other, that becomes necessary in the operation of forcing the head of the button through the button-hole of the collar; in other words the connection must be such that the two sections or portions may assume a parallel position, while the hook-portion or section 10 is being forced through the arc of a circle, as indicated in dotted lines in Fig. 3, by the power applied through manipulation of the portion or section 12.

In practice, the hook of the section or portion 10 is secured about the shank of the button 15 after first having been passed through the button-hole 16 of the unattached end 17 of the collar; the free or handle portion or section 12 being left extending through the button-hole 16, as indicated in Fig. 1. After the hook has been attached about the shank of the button 15, the section or portion 12, as well as the stem of the section or portion 10, are drawn through the button-hole 16 to the outside of the collar, thereby forcing the collar over into the position indicated in Fig. 2 so as to bring the button-hole 16 into close proximity with the button 15.

The operation just described is caused by movement of the device through the arc of a circle about the button 15, as indicated by the arrows in Figs. 1 and 2. This will bring the device into the position shown in Fig. 2, that is, if the operation is being performed by the right hand of the manipulator. The device is then further swung or forced through the arc of a circle about the button 15, as indicated in full lines and in dotted lines in Fig. 3. The movement into the position shown in full lines in Fig. 3 will force the button-hole 16 partially over the head of the button 15, as indicated; while further movement of the device will cause the shank or stem of the portion or section 10 to force the upper part of the button-hole over the upper portion of the head of the collar-button, so that the head of the button will have been completely forced through the button-hole of the collar, after which the hook of the section or portion 10 may be forced upward away from the shank of the button, as shown in Fig. 4.

The advantages of the construction are so apparent that a further statement thereof is deemed unnecessary; and while I have shown and described what I believe to be the simplest form of my device, changes may be made in certain details without departing from the spirit of my invention, and I do not wish to be understood as limiting myself to the precise construction shown and described.

What I claim is:—

A buttoner, comprising a sectional member or rod, at least one section thereof terminating in a hook and formed cylindrical and comparatively short so as to permit movement through the arc of a circle between the folds of a collar, the adjacent ends of the sections being apertured, and a loose link connection between the apertured ends of the sections whereby these sections may be folded parallel with each other throughout their length and be moved into any inclination relative to each other so that the connected end of the second or handle-section is permitted to move, between the folds of a collar, through the same arc of a circle as the hook-section.

FRANK N. STURGIS.

Witnesses:
 PHOEBE SUHR,
 GRACE C. DEILY.

Copies of this patent may be obtained for five cents each, by addressing the "Commissioner of Patents, Washington, D. C."